United States Patent
Masuko

(10) Patent No.: US 8,744,175 B2
(45) Date of Patent: Jun. 3, 2014

(54) IMAGE PROVIDING DEVICE, IMAGE PROCESSING METHOD, IMAGE PROCESSING PROGRAM, AND RECORDING MEDIUM FOR CAUSING A MOSAIC IMAGE BY COMBINING IMAGES

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/819,183

(22) PCT Filed: Apr. 2, 2012

(86) PCT No.: PCT/JP2012/058824
§ 371 (c)(1),
(2), (4) Date: Feb. 26, 2013

(87) PCT Pub. No.: WO2012/176521
PCT Pub. Date: Dec. 27, 2012

(65) Prior Publication Data
US 2013/0156306 A1    Jun. 20, 2013

(30) Foreign Application Priority Data

Jun. 24, 2011   (JP) .................................. 2011-140288

(51) Int. Cl.
*G06K 9/34*    (2006.01)
(52) U.S. Cl.
USPC ........................... 382/164; 382/173; 358/518
(58) Field of Classification Search
USPC ................................... 382/164, 173; 358/518
See application file for complete search history.

(56) References Cited

U.S. PATENT DOCUMENTS 5,901,246 A * 5/1999 Hoffberg et al. ............... 382/209
6,556,210 B1   4/2003 Yamamoto et al.
(Continued)

FOREIGN PATENT DOCUMENTS

JP    11-341266 A    12/1999
JP    2000-295453 A    10/2000
(Continued)

OTHER PUBLICATIONS

Kazuyo Kojima, et al., "Decorative Photomosaics Respecting Human Visual Perception", Transactions of Information Processing Society of Japan, Jul. 15, 2008, pp. 2703-2711, vol. 49, No. 7.

(Continued)

*Primary Examiner* — Chan Park
*Assistant Examiner* — Eueng-Nan Yeh
(74) *Attorney, Agent, or Firm* — Sughrue Mion, PLLC

(57) ABSTRACT

Even a mosaic image in an uncompleted state, it makes a mosaic image having high recognizability of a picture of an original image displayed. An image providing device includes an image acquisition means that acquires an image specified by a user, a candidate determination means that, on the basis of color information of the acquired image and color information of the regions, determines regions to be candidates for a region to which the acquired image is assigned, an edge degree acquisition means that acquires edge degrees indicating degrees of edges in the regions determined as the candidates, an assignment determination means that, on the basis of the acquired edge degrees, determines a region to which the acquired image is assigned from the regions determined as the candidates, and a presentation means that, on the basis of assignment determined by the assignment determination means, causes a mosaic image in which the acquired image is placed to be presented.

8 Claims, 11 Drawing Sheets

(56) References Cited

U.S. PATENT DOCUMENTS

| | | | |
|---|---|---|---|
| 6,927,874 B1* | 8/2005 | Enokida et al. | 358/1.18 |
| 7,046,842 B2* | 5/2006 | Lin et al. | 382/165 |
| 2006/0126729 A1* | 6/2006 | Nakayama | 375/240.03 |
| 2011/0050723 A1 | 3/2011 | Tokunaga et al. | |
| 2011/0293146 A1* | 12/2011 | Grycewicz | 382/106 |

FOREIGN PATENT DOCUMENTS

| | | |
|---|---|---|
| JP | 2001-238067 A | 8/2001 |
| JP | 2010-004166 A | 1/2010 |
| JP | 2011-078078 A | 4/2011 |

OTHER PUBLICATIONS

Keita Funabashi, et al., "Real-time photo mosaic for data base generation of edge feature", Eizo Media Shori Symposium Dai 14 Kai Symposium Shiryo, Oct. 7, 2009, pp. 89-90.

Shin'ichi Doi, et al., "Photo paint of PSP2P Network", Symposium on Multimedia, Distributed, Cooperative and Mobile Systems (DICOMO2009) Ronbunshu, Jul. 8, 2009, pp. 1855-1862, vol. 2009, No. 1.

* cited by examiner

FIG.5A
MEMBER INFORMATION DB 12a

| USER ID |
| --- |
| PASSWORD |
| NICKNAME |
| NAME |
| DATE OF BIRTH |
| GENDER |
| ADDRESS |
| PHONE NUMBER |
| EMAIL ADDRESS |
| . . . |

FIG.5B
ORIGINAL IMAGE DB 12b

| ORIGINAL IMAGE ID |
| --- |
| ORIGINAL IMAGE DATA |
| DIVISION NUMBER INFORMATION |
| DIVIDED REGION INFORMATION (0, 0) |
| DIVIDED REGION INFORMATION (0, 1) |
| DIVIDED REGION INFORMATION (0, 2) |
| . . . |

FIG.5C
DIVIDED REGION INFORMATION

| REPRESENTATIVE COLOR VALUE |
| --- |
| BASIC EDGE DEGREE |
| EXTENDED EDGE DEGREE |

FIG.5D
POSTED IMAGE DB 12c

| MOSAIC IMAGE ID |
| --- |
| NUMBER OF POSTED IMAGES |
| POSTED IMAGE INFORMATION 1 |
| POSTED IMAGE INFORMATION 2 |
| POSTED IMAGE INFORMATION 3 |
| . . . |

FIG.5E
POSTED IMAGE INFORMATION

| IMAGE NUMBER |
| --- |
| USER ID |
| POSTED IMAGE DATA |
| REPRESENTATIVE COLOR VALUE |

FIG.5F
MOSAIC IMAGE DB 12d

| MOSAIC IMAGE ID |
| --- |
| ORIGINAL IMAGE ID |
| ASSIGNMENT IMAGE NUMBER (0, 0) |
| ASSIGNMENT IMAGE NUMBER (0, 1) |
| ASSIGNMENT IMAGE NUMBER (0, 2) |
| . . . |
| MOSAIC IMAGE DISPLAY DATA |

BASIC EDGE DEGREE

|   | 0 | 1 | 2 | 3 | 4 | 5 | 6 | 7 | 8 |
|---|---|---|---|---|---|---|---|---|---|
| 0 | 0 | 0 | 0 | 0 | 3 | 0 | 0 | 0 | 0 |
| 1 | 0 | 0 | 0 | 1 | 7 | 2 | 0 | 0 | 0 |
| 2 | 0 | 0 | 0 | 5 | 8 | 0 | 0 | 7 | 3 |
| 3 | 0 | 0 | 6 | 6 | 20 | 8 | 6 | 7 | 5 |
| 4 | 0 | 13 | 0 | 10 | 10 | 12 | 14 | 13 | 9 |
| 5 | 14 | 20 | 0 | 0 | 9 | 0 | 6 | 0 | 1 |
| 6 | 28 | 6 | 6 | 8 | 13 | 0 | 6 | 0 | 0 |
| 7 | 35 | 6 | 3 | 0 | 7 | 13 | 8 | 0 | 0 |
| 8 | 0 | 10 | 0 | 0 | 6 | 6 | 8 | 0 | 0 |
| 9 | 0 | 9 | 0 | 0 | 7 | 0 | 4 | 6 | 0 |
| 10 | 0 | 0 | 0 | 0 | 4 | 1 | 0 | 11 | 0 |

FIG.7A

EXTENDED EDGE DEGREE
(SIMPLE AVERAGE OF BASIC EDGE DEGREES)

|   | 0 | 1 | 2 | 3 | 4 | 5 | 6 | 7 | 8 |
|---|---|---|---|---|---|---|---|---|---|
| 0 | 0.0 | 0.0 | 0.2 | 1.8 | 2.2 | 2.0 | 0.3 | 0.0 | 0.0 |
| 1 | 0.0 | 0.0 | 0.7 | 2.7 | 2.9 | 2.2 | 1.0 | 1.1 | 1.7 |
| 2 | 0.0 | 0.7 | 2.0 | 5.9 | 6.3 | 5.7 | 3.3 | 3.1 | 3.7 |
| 3 | 2.2 | 2.1 | 4.4 | 7.2 | 8.8 | 8.7 | 7.4 | 7.1 | 7.3 |
| 4 | 7.8 | 5.9 | 6.1 | 6.8 | 8.3 | 9.4 | 7.3 | 6.8 | 5.8 |
| 5 | 13.5 | 9.7 | 7.0 | 6.2 | 6.9 | 7.8 | 5.7 | 5.4 | 3.8 |
| 6 | 18.2 | 13.1 | 5.4 | 5.1 | 5.6 | 6.9 | 3.7 | 2.3 | 0.2 |
| 7 | 14.2 | 10.4 | 4.3 | 4.8 | 5.9 | 7.4 | 4.6 | 2.4 | 0.0 |
| 8 | 10.0 | 7.0 | 3.1 | 2.6 | 4.3 | 6.6 | 5.0 | 2.9 | 1.0 |
| 9 | 3.2 | 2.1 | 2.1 | 1.9 | 2.7 | 4.0 | 4.0 | 3.2 | 2.8 |
| 10 | 2.3 | 1.5 | 1.5 | 1.8 | 2.0 | 2.7 | 3.7 | 3.5 | 4.3 |

FIG.7B

WEIGHT COEFFICIENT

| 1/9 | 1/9 | 1/9 |
|---|---|---|
| 1/9 | 1/9 | 1/9 |
| 1/9 | 1/9 | 1/9 |

FIG.8A

EXTENDED EDGE DEGREE
(CASE IN WHICH WEIGHT OF BASIC EDGE DEGREE OF REGION OF INTEREST IS INCREASED)

|    | 0    | 1    | 2   | 3   | 4    | 5    | 6   | 7   | 8   |
|----|------|------|-----|-----|------|------|-----|-----|-----|
| 0  | 0.0  | 0.0  | 0.1 | 1.5 | 2.3  | 1.6  | 0.3 | 0.0 | 0.0 |
| 1  | 0.0  | 0.0  | 0.5 | 2.3 | 3.9  | 2.2  | 0.8 | 0.8 | 1.3 |
| 2  | 0.0  | 0.5  | 1.5 | 5.7 | 6.8  | 4.3  | 2.5 | 4.1 | 3.5 |
| 3  | 1.7  | 1.6  | 4.8 | 6.9 | 11.6 | 8.5  | 7.1 | 7.1 | 6.9 |
| 4  | 6.3  | 7.7  | 4.6 | 7.6 | 8.8  | 10.1 | 9.0 | 8.3 | 6.5 |
| 5  | 13.6 | 12.3 | 5.3 | 4.7 | 7.4  | 5.8  | 5.8 | 4.1 | 3.3 |
| 6  | 20.1 | 11.3 | 5.6 | 5.8 | 7.4  | 5.2  | 4.3 | 1.8 | 0.1 |
| 7  | 18.3 | 9.3  | 4.0 | 3.6 | 6.2  | 8.8  | 5.4 | 1.8 | 0.0 |
| 8  | 8.0  | 7.8  | 2.3 | 1.9 | 4.8  | 6.4  | 5.8 | 2.2 | 0.8 |
| 9  | 2.5  | 3.8  | 1.6 | 1.4 | 3.8  | 3.0  | 4.0 | 3.9 | 2.3 |
| 10 | 2.0  | 1.2  | 1.2 | 1.5 | 2.4  | 2.3  | 2.9 | 5.0 | 3.8 |

FIG.8B

WEIGHT COEFFICIENT

| 1/12 | 1/12 | 1/12 |
|------|------|------|
| 1/12 | 1/3  | 1/12 |
| 1/12 | 1/12 | 1/12 |

IMAGE PROVIDING DEVICE, IMAGE PROCESSING METHOD, IMAGE PROCESSING PROGRAM, AND RECORDING MEDIUM FOR CAUSING A MOSAIC IMAGE BY COMBINING IMAGES

This application is a National Stage of International Application No. PCT/JP2012/058824 filed Apr. 2, 2012, claiming priority based on Japanese Patent Application No. 2011-140288 filed Jun. 24, 2011, the contents of all of which are incorporated herein by reference in their entirety.

TECHNICAL FIELD

The present invention relates to a technical field of an image providing device and an image processing method for causing a mosaic image formed by combining images acquired from a terminal device to be presented.

BACKGROUND ART

Conventionally, as a representation method of an image in, for example, a poster and a Web page used for an advertisement, a notice of an event, and the like, a method is known in which a plurality of images to be combined (hereinafter referred to as "material images") are arranged like tiles and the images are represented as a mosaic image (for example, a mosaic art and a photo mosaic). In this representation method, for example, an image (hereinafter referred to as an "original image") to be an original of a picture of the mosaic image is divided into a plurality of regions. Each material image is assigned to, for example, a region whose color tone, pattern or the like is similar to those of the material image. Thereby, a mosaic image which represents a picture of the original image is generated.

On the other hand, a technique is known in which a server device acquires images, which are provided from a user as material images, from a terminal device through a network and causes the terminal device to display a mosaic image generated by using the acquired images. In this case, what images are the material images depends on a determination of the user who provides the images. Therefore, when such images are used as the material images, a problem to be solved is how to generate a mosaic image which has high recognizability of a picture of the original image.

For example, Patent Literature 1 discloses a technique, the object of which is to provide a mosaic image that has high recognizability. Specifically, when a mosaic image providing device determines a block, in which a material image posted by a user is placed, from a plurality of blocks obtained by dividing a target image which is an original of the mosaic image, the mosaic image providing device determines a block selected by the user to be a block in which the material image is placed or automatically determines a block in which the material image is placed without being limited by an image of the block. Further, the mosaic image providing device corrects color of a material image so that an average density value of a basic color of the material image is an average density value of the basic color of a block in which the material image is placed. Furthermore, until when the number of material images posted by the user reaches a number necessary to complete the mosaic image, a mosaic image in which the material images are placed in only a part of the blocks is displayed on the terminal device. In other words, a mosaic image in an uncompleted state is displayed.

CITATION LIST

Patent Literature

Patent Literature 1: JP 2010-4166 A

SUMMARY OF INVENTION

Technical Problem

However, it cannot be said that the mosaic image in an uncompleted state generated by the technique described in Patent Literature 1 has high recognizability of the picture of the original image. The reason of this is because a method of determining a block in which a material image is placed has no specific standard. Specifically, this is because a block in which a material image is placed is determined regardless of the picture of the original image, so that a mosaic image may be generated in a state in which a material image is not placed in a block (for example, a block of a contour portion and a characteristic portion of the picture) that contributes to improve the recognizability of the picture of the original image.

Even if a material image is placed in a block which has a color tone and a pattern similar to those of the material image, it cannot be said that this immediately improves the recognizability of the picture of the original image. This is because a block which has a color tone and a pattern similar to those of the material image is not necessarily a block which contributes to improve the recognizability of the picture of the original image.

The present invention is made in view of the above situation, and an object of the present invention is to provide an image providing device, an image processing method, an image processing program, and a recording medium which can causes a mosaic image having high recognizability of the picture of the original image to be presented even if the mosaic image is in an uncompleted state.

Solution to Problem

In order to achieve the above object, an invention described in claim 1 is an image providing device for providing a mosaic image of an original image divided into a plurality of regions, the image providing device comprising: an image acquisition means that acquires an image specified by a user; a candidate determination means that, on the basis of color information of the acquired image and color information of the regions, determines the regions to be candidates for a region to which the acquired image is assigned; an edge degree acquisition means that acquires edge degrees indicating degrees of edges in the regions determined as the candidates; an assignment determination means that, on the basis of the acquired edge degrees, determines the region to which the acquired image is assigned from the regions determined as the candidates; and a presentation means that, on the basis of assignment determined by the assignment determination means, causes a mosaic image in which the acquired image is placed to be presented.

According to this invention, the region to which the image is assigned is determined on the basis of the edge degrees of the regions determined to be the candidates for a region to which the image is assigned, so that it is possible to preferentially assign the image to a region which contributes to improve the recognizability of the picture of the original image. Therefore, it is possible to present a mosaic image having high recognizability of the picture of the original image even when the mosaic image is in an uncompleted state.

An invention described in claim 2 is the image providing device according to claim 1, further comprising: a first calculation means that calculates a first edge degree indicating a degree of an edge included in an image of the region, wherein the edge degree acquisition means acquires the calculated first edge degree as the edge degree.

According to this invention, the region to which the image is assigned is determined on the basis of the edge degrees in an image in the regions determined to be the candidates for the region to which the image is assigned, so that it is possible to preferentially assign the image to a region including an image which contributes to improve the recognizability of the picture of the original image.

An invention described in claim 3 is the image providing device according to claim 2, further comprising: a second calculation means that calculates a second edge degree indicating a degree of an edge in a certain region on the basis of the first edge degree of the certain region and the first edge degree of the regions adjacent to the certain region, the second calculation means calculating the second edge degree so that the higher the first edge degree is, the higher the second edge degree is, wherein the edge degree acquisition means acquires the calculated second edge degree as the edge degree.

According to this invention, it is possible to preferentially assign the images to a region including an image which contributes to improve the recognizability of the picture of the original image and regions adjacent to the region. Therefore, the images are assigned to these regions, so that the recognizability of the picture of the original image can be further improved.

An invention described in claim 4 is the image providing device according to claim 3, wherein the second calculation means calculates the second edge degree by weighting the first edge degrees so that a weight of the first edge degree of the certain region is greater than a weight of the first edge degree of the adjacent region.

According to this invention, while the images are preferentially assigned to a region including an image which contributes to improve the recognizability of the picture of the original image and the regions adjacent to the region, it is possible to more preferentially assign the image to the region including the image which contributes to improve the recognizability of the picture of the original image. Therefore, the recognizability of the picture of the original image can be further improved.

An invention described in claim 5 is the image providing device according to any one of claims 1 to 4, wherein the assignment determination determines the region where the acquired edge degree is highest to be a region to which the acquired image is assigned.

According to this invention, the image is assigned to a region having the highest edge degree among the regions determined to be a candidate of a region to which the image is assigned. Therefore, it is possible to preferentially assign the image to a region which contributes to improve the recognizability of the picture of the original image.

An invention described in claim 6 is the image providing device according to any one of claims 1 to 5, further comprising: a color information acquisition means that acquires color information indicating a representative color of the acquired image by a value and color information indicating a representative color of the region by a value, wherein the candidate determination means determines the region where a difference between the value of the color information of the acquired image and the value of the color information of the region is smaller than or equal to a threshold value to be the candidate.

According to this invention, the image is assigned to a region having a representative color similar to that of the acquired image. Therefore, the recognizability of the picture of the original image can be further improved.

An invention described in claim 7 is an image processing method in an image providing device for providing a mosaic image of an original image divided into a plurality of regions, the image processing method comprising: an image acquisition step of acquiring an image specified by a user; a candidate determination step of, on the basis of color information of the acquired image and color information of the regions, determining the regions to be candidates for a region to which the acquired image is assigned; an edge degree acquisition step of acquiring edge degrees indicating degrees of edges in the regions determined as the candidates; an assignment determination step of, on the basis of the acquired edge degrees, determining the region to which the acquired image is assigned from the regions determined as the candidates; and a presentation step of, on the basis of assignment determined in the assignment determination step, causing a mosaic image in which the acquired image is placed to be presented.

An invention described in claim 8 is an image processing program that causes a computer included in an image providing device for providing a mosaic image of an original image divided into a plurality of regions to function as: an image acquisition means that acquires an image specified by a user; a candidate determination means that, on the basis of color information of the acquired image and color information of the regions, determines the regions to be candidates for a region to which the acquired image is assigned; an edge degree acquisition means that acquires edge degrees indicating degrees of edges in the regions determined as the candidates; an assignment determination means that, on the basis of the acquired edge degrees, determines the region to which the acquired image is assigned from the regions determined as the candidates; and a presentation means that, on the basis of assignment determined by the assignment determination means, causes a mosaic image in which the acquired image is placed to be presented.

An invention described in claim 9 is a recording medium in which an image processing program is computer-readably recorded, the image processing program causing a computer, which is included in an image providing device for providing a mosaic image of an original image divided into a plurality of regions, to function as: an image acquisition means that acquires an image specified by a user; a candidate determination means that, on the basis of color information of the acquired image and color information of the regions, determines the regions to be candidates for a region to which the acquired image is assigned; an edge degree acquisition means that acquires edge degrees indicating degrees of edges in the regions determined as the candidates; an assignment determination means that, on the basis of the acquired edge degrees, determines the region to which the acquired image is assigned from the regions determined as the candidates; and a presentation means that, on the basis of assignment determined by the assignment determination means, causes a mosaic image in which the acquired image is placed to be presented.

Advantageous Effects of Invention

According to the invention, the region to which the image is assigned is determined on the basis of the edge degrees of the regions determined to be the candidates for a region to which the image is assigned, so that it is possible to preferentially assign the image to a region which contributes to improve the recognizability of the picture of the original image. Therefore, it is possible to present a mosaic image having high recognizability of the picture of the original image even when the mosaic image is in an uncompleted state.

BRIEF DESCRIPTION OF DRAWINGS

FIG. 5A is a diagram showing an example of content registered in a member information DB 12a according to the embodiment. FIG. 5B is a diagram showing an example of content registered in an original image DB 12b. FIG. 5C is a diagram showing an example of content included in divided region information. FIG. 5D is a diagram showing an example of content registered in a posted image DB 12c. FIG. 5E is a diagram showing an example of content included in posted image information. FIG. 5F is a diagram showing an example of content registered in a mosaic image DB 12d.

FIG. 7A is a diagram showing an example of an extended edge degree of each divided region of the original image 100. FIG. 7B is a diagram showing an example of a weight coefficient of an edge degree of each divided region.

FIG. 8A is a diagram showing an example of the extended edge degrees when a weight of the basic edge degree of a region of interest is increased. FIG. 8B is a diagram showing an example of a weight coefficient of an edge degree of each divided region when the weight of the basic edge degree of the region of interest is increased.

DESCRIPTION OF EMBODIMENT

Hereinafter, an embodiment of the present invention will be described in detail with reference to the drawings. The embodiment described below is an embodiment where the present invention is applied to a mosaic image providing system.

1. Schematic Configuration and Function of Mosaic Image Providing System

Figure 1:
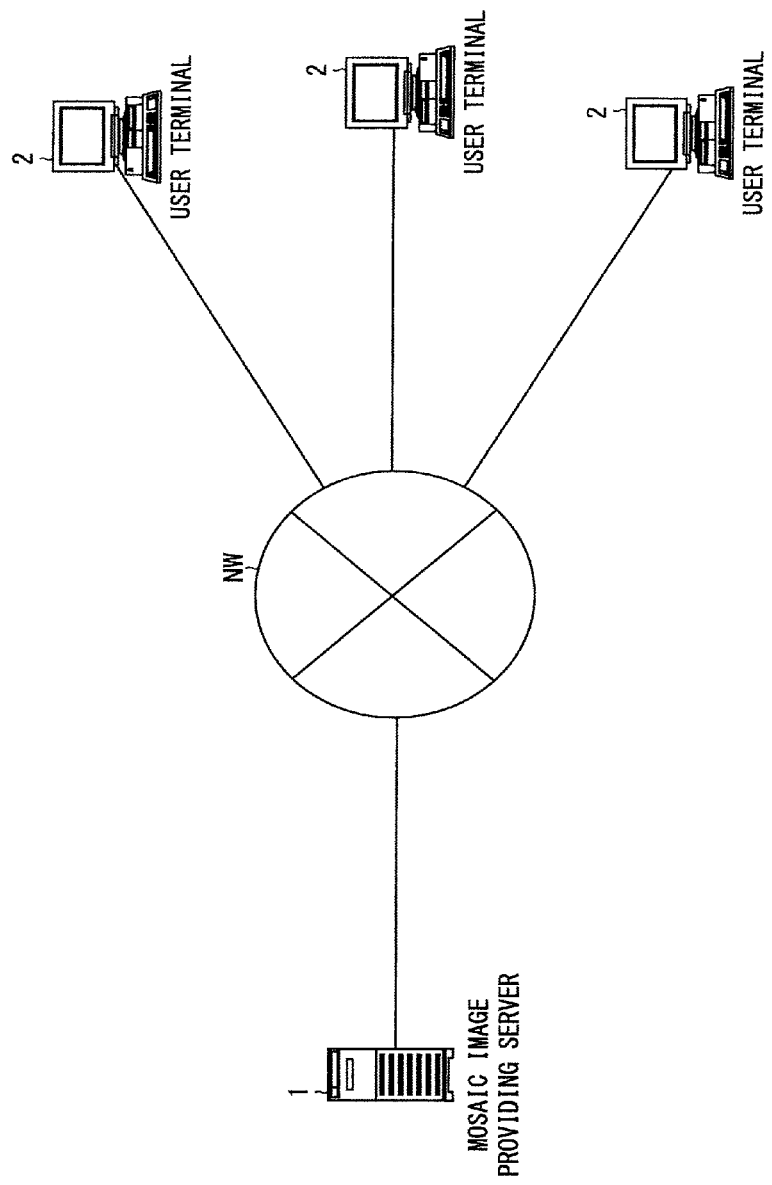
FIG. 1 is a diagram showing an example of a schematic configuration of a mosaic image providing system S according to an embodiment.

First, configuration and function of a mosaic image providing system S according to the embodiment will be described with reference to FIGS. 1 to 3. FIG. 1 is a diagram showing an example of a schematic configuration of the mosaic image providing system S according to the embodiment.

As shown in FIG. 1, the mosaic image providing system S is configured to include a mosaic image providing server 1 and a plurality of user terminals 2. The mosaic image providing server 1 and each user terminal 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and gateways.

The mosaic image providing server 1 (an example of an image providing device of the present invention) is a Web server that transmits a Web page in which a mosaic image is displayed to a user terminal 2. The mosaic image is formed by arranging (combining) a plurality of images to be materials in a pattern like tiles. The mosaic image providing server 1 acquires images from each user terminal 2 through the network NW in order to collect images to be materials. The image acquired from the user terminal 2 is an image posted by a user (hereinafter referred to as a "posted image").

The user terminal 2 is a terminal device of a user who uses the mosaic image providing system S. The user terminal 2 accesses the mosaic image providing server 1 on the basis of an operation from a user. Thereby, the user terminal 2 receives a Web page from the mosaic image providing server 1 and displays the Web page. The user posts an image to be a material of a mosaic image and causes the mosaic image to be displayed through a Web page displayed on a screen of the user terminal 2. In the user terminal 2, software such as a browser and an email client is installed. For example, a personal computer, a PDA (Personal Digital Assistant), a mobile information terminal such as a smartphone, and a mobile phone are used as the user terminal 2.

In the mosaic image providing system S having such a configuration, for example, an image to be an origin of a picture of the mosaic image is prepared in advance. This image is an original image. The mosaic image providing server 1 arranges posted images so that the picture represented by the mosaic image is similar to the picture represented by the original image.

Figure 2:
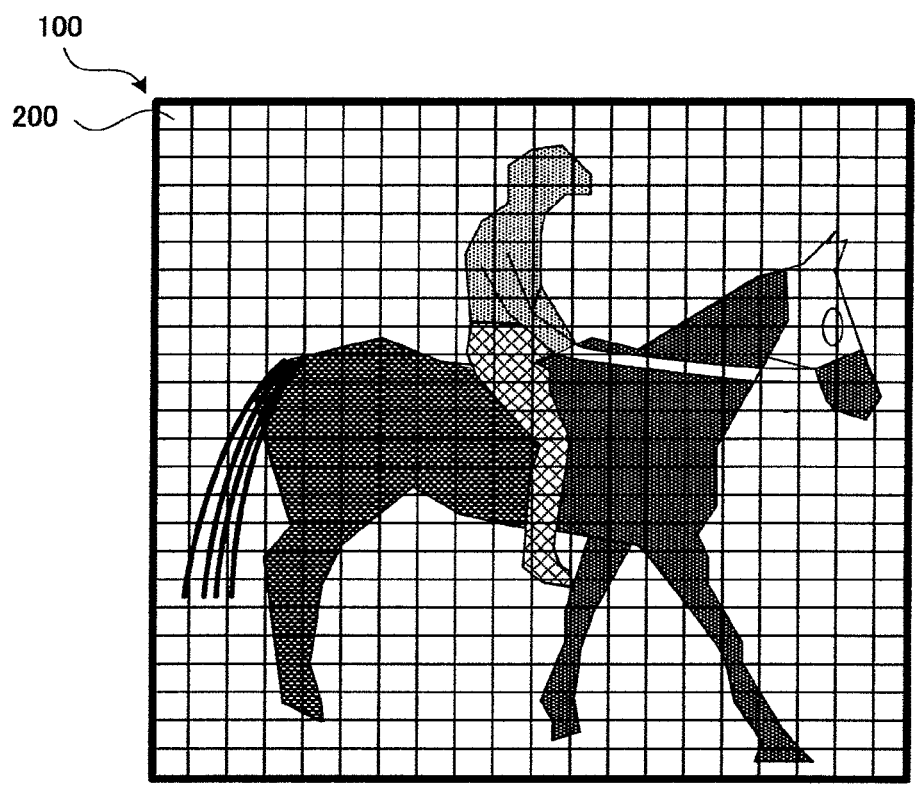
FIG. 2 is a diagram showing an example of a case in which an original image 100 is divided into 480 divided regions.

FIG. 2 is a diagram showing an example of the original image. An image 100 shown in FIG. 2 is an image representing a picture of a walking horse and a horseman riding the horse. Here, it is assumed that the color of the horse is dark brown. Also it is assumed that the color of the trousers of the horseman is yellow and the color of the jacket of the horseman is light blue. Further, it is assumed that the color of the background is white. It is assumed that each portion is not filled with a uniform color but there is some color variation depending on positions.

The original image is divided into a plurality of regions (hereinafter referred to as "divide regions") indicated by reference numeral 200. For example, the image 100 is divided into 20 regions in the horizontal direction and 24 regions in the vertical direction to be a total of 480 divided regions. The number of the divided regions is referred to as "the number of division". A posted image acquired from the user terminal 2 is assigned to each divided region. Assigning a posted image to a divided region means placing the posted image to a position corresponding to a divided region that is an assigned destination in a mosaic image.

Every time the mosaic image providing server 1 receives a posted image from the user terminal 2, the mosaic image providing server 1 assigns the posted image to a divided region and generates a Web page where a mosaic image in which posted images collected so far are arranged is displayed. Therefore, a mosaic image in an uncompleted state is displayed on the Web page until the number of collected posted images reaches the number of division of the original image. In other words, there are regions in which no posted image is placed in the mosaic image. The mosaic image in this state may be difficult to be recognized by a user who sees the mosaic image as a picture of the original image that should be represented by the mosaic image.

Therefore, the mosaic image providing server 1 determines a divided region to which a posted image is assigned so that the picture of the original image can be recognized as early as possible or the recognizability of the picture of the original image increases even when the number of the posted image is not so large. Specifically, the higher the edge degree of the divided region among divided regions having a color similar to that of the posted image, the more preferentially the posted image is assigned to the divided region. The edge is a portion in which, for example, the brightness, the color phase, and the chroma saturation of the image change rapidly (sharply). The mosaic image providing server 1 calculates the edge degree of each divided region as an index representing the degree of the edge. The higher the degree of the change of the brightness and the like in the image included in the divided region, that is, the stronger the edge, the higher the edge degree of the divided region. In addition, the more the amount of edge included in the divided region, the higher the edge degree of the divided region. A divided region having a high edge degree is, for example, a contour portion, a characteristic portion, or a portion of a complex pattern in the picture of the original image. The mosaic image providing server 1 improves the recognizability of the picture of the original image by preferentially assigning the posted images to such portions.

Figure 3A:
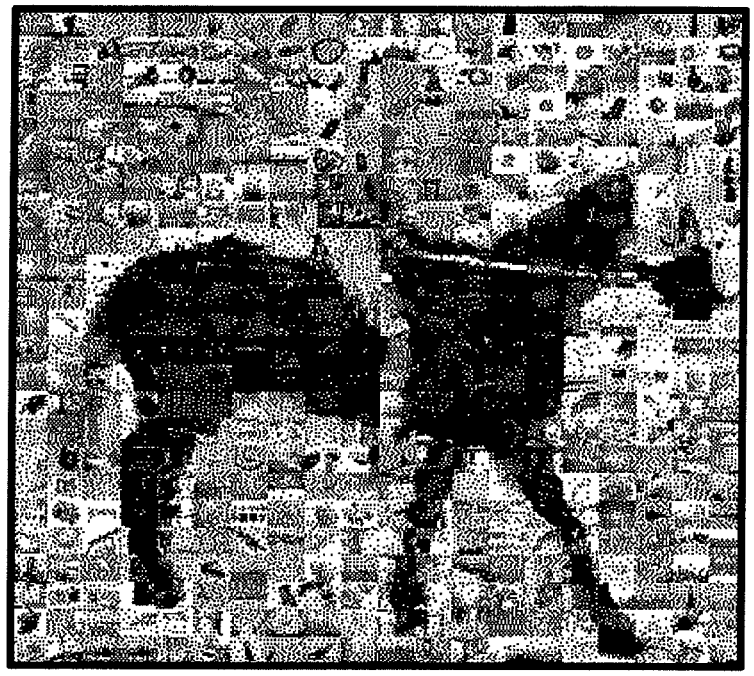
FIG. 3A is a diagram showing an example of a mosaic image 300a in a completed state and FIG. 3B is a diagram showing an example of a mosaic image 300b in an uncompleted state.
Figure 3B:
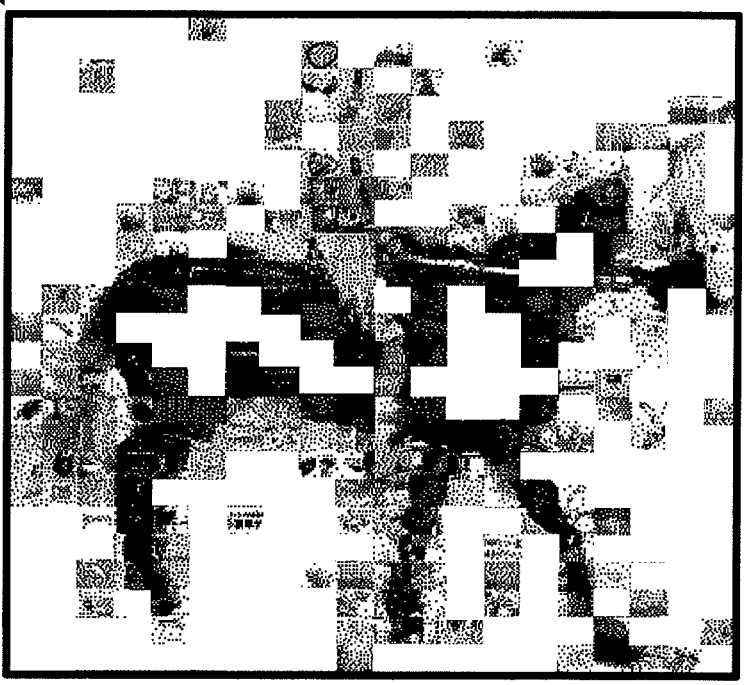

FIGS. 3A and 3B are diagrams showing display examples of a mosaic image. The mosaic images shown in FIGS. 3A and 3B are mosaic images whose original image is the image 100. The mosaic image shown in FIG. 3A is a mosaic image 300a in a completed state. In other words, posted images are assigned to all of the 480 divided regions. On the other hand, the mosaic image shown in FIG. 3B is a mosaic image 300b in an uncompleted state. In the mosaic image 300b, posted images are assigned to about 200 divided regions. In the image 100, the edge degree is high in the divided regions of the contour portion of the horse, the contour portion of the horseman, the horse tail portion having a fine pattern, and the like. Therefore, the rate in which the posted images are assigned to such divided regions is higher than the rate in which the posted images are assigned to other regions. Therefore, even in this state, it is relatively easy to recognize the horse and the horseman from the mosaic image 300b. In other words, in this case, the recognizability of the picture of the original image is higher than that in a case where the posted images are not assigned on the basis of the edge degree. A user who sees the mosaic image can recognize or estimate what is the picture of the original image in a relatively early stage. Therefore, for example, the user can easily determine what image should be posted and can easily predict what region the image to be posted will be assigned to.

Among divided regions having not so high edge degree, the rate in which the posted images are assigned to the divided regions adjacent to divided regions having a high edge degree is higher than the rate in which the posted images are assigned to the divided regions not adjacent to divided regions having a high edge degree. In summary, on the whole, the posted images are preferentially assigned to divided regions having a high edge degree and then to divided regions adjacent to the divided regions having a high edge degree. Thereby, the recognizability of the picture of the original image can be further improved.

As described above, in the embodiment, a posted image is assigned to a divided region having a color similar to that of the posted image. Therefore, even in a stage when the number of collected posted images is not so large, a posted image may be assigned to a divided region whose edge degree is not high depending on the color of the posted image. Even when the number of the collected posted images is the same, the recognizability may vary depending on the colors and the like of the posted images collected so far.

2. Configuration of Mosaic Image Providing Server

Next, a configuration of the mosaic image providing server 1 will be described with reference to FIGS. 4 to 8.

Figure 4:
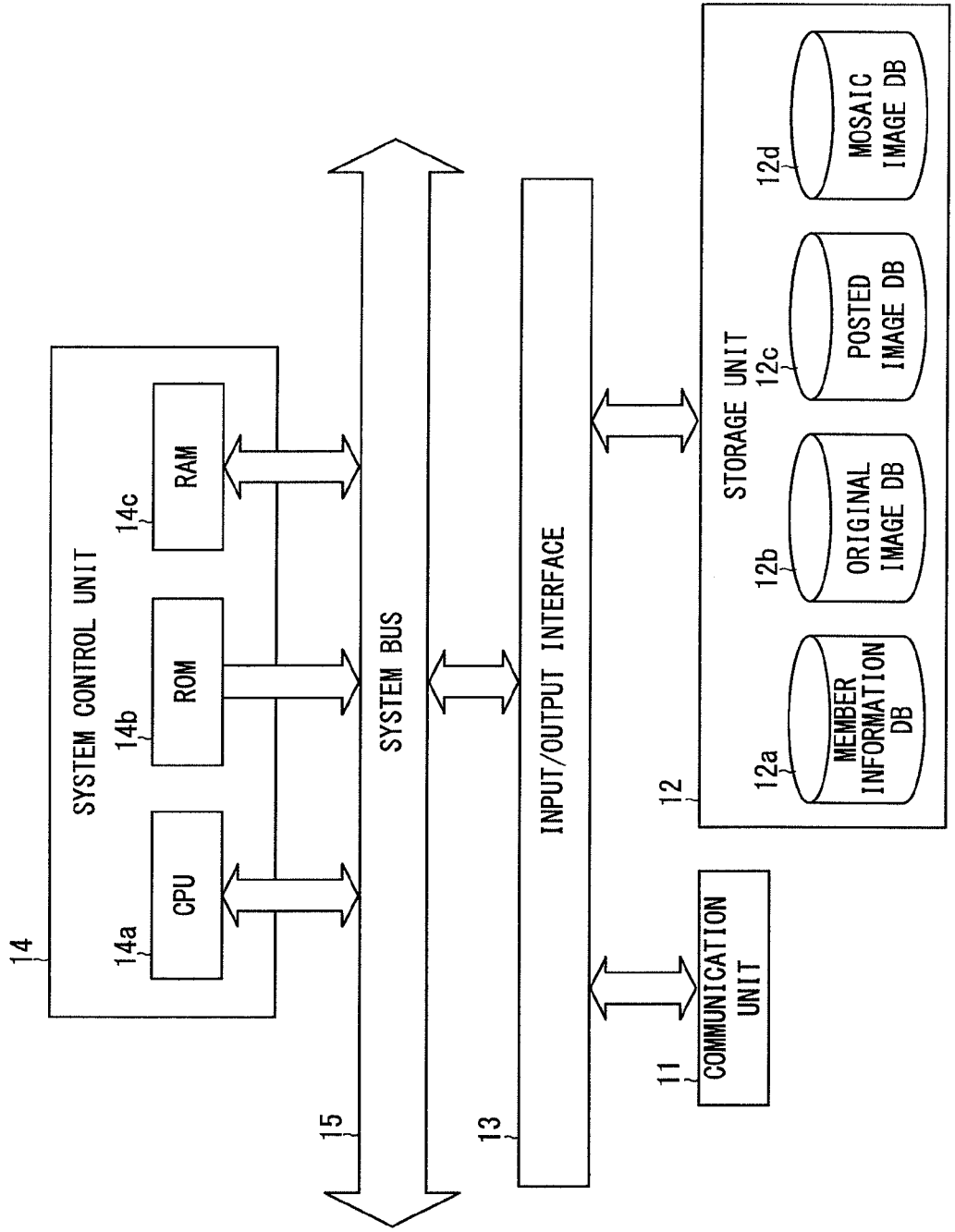
FIG. 4 is a block diagram showing an example of a schematic configuration of a mosaic image providing server 1 according to the embodiment.

FIG. 4 is a block diagram showing an example of a schematic configuration of the mosaic image providing server 1 according to the embodiment. As shown in FIG. 4, the mosaic image providing server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminals 2 and the like.

The storage unit 12 includes, for example, a hard disk drive and the like. In the storage unit 12, a member information DB (database) 12a, an original image DB 12b, a posted image DB 12c, a mosaic image DB 12d, and the like are constructed.

FIG. 5A is a diagram showing an example of content registered in the member information DB 12a according to the embodiment. In the member information DB 12a, member information related to users registered as a member in the mosaic image providing system S is registered. Specifically, in the member information DB 12a, a user ID which is identification information of the user, a password, a nickname, a name, a date of birth, a gender, an address, a phone number, an email address, and the like are registered in association with each user.

FIG. 5B is a diagram showing an example of content registered in the original image DB 12b according to the embodiment. In the original image DB 12b, original images and information related to the original images are registered. Specifically, in the original image DB 12b, an original image ID which is identification information of the original image, original image data, division number information, a plurality of pieces of divided region information are registered in association with each original image.

The original image ID is identification information of an original image. The original image data is image data of an original image. Examples of a format of the image data used in the mosaic image providing system S include JPEG (Joint Photographic Experts Group), TIFF (Tagged-Image File Format), and PNG (Portable Network Graphics).

The division number information is information indicating the number of division. Specifically, the division number information includes the number of division, the number of horizontal division, and the number of vertical division of an original image. The number of horizontal division is the number of divided regions in the horizontal direction. Specifically, the number of horizontal division is the number of divided regions of the original image arranged in the horizontal direction. The number of vertical division is the number of divided regions in the vertical direction. Specifically, the number of vertical division is the number of divided regions of the original image arranged in the vertical direction. The number of division of the original image is obtained by multiplying the number of horizontal division by the number of vertical division.

The divided region information is information related to a divided region. The number of pieces of divided region information to be registered is equal to the number of division of the original image. Each divided region information is registered in association with an index of a corresponding divided region. An index having a form of (X, Y) is assigned to each divided region. Here, X indicates a position of the divided region in the horizontal direction. Y indicates a position of the divided region in the vertical direction. The index of the divided region located at the upper left corner of the original image is (0, 0). The divided region (X, Y) is a divided region located at the (Y+1)th position from the uppermost position among the divided regions located at the (X+1)th position from the leftmost position.

Dividing the original image into a plurality of regions is dividing a region corresponding to the entire original image into a plurality of regions, that is, making it possible to specify in what region each pixel in the original image is included (or what pixels each region includes). The system control unit 14 can specify a region in which each pixel is included by acquiring the numbers of pixels in the original image in the vertical and horizontal directions and the numbers of horizontal division and vertical division of the original image. Therefore, dividing the original image into a plurality of regions does not necessarily mean dividing the image data of the original image into image data of each region. Therefore, the system control unit 14 may register image data of each region into the original image DB 12b or need not register image data of each region into the original image DB 12b.

FIG. 5C is a diagram showing an example of content included in the divided region information. As shown in FIG. 5C, in the divided region information, a representative color value, the basic edge degree, and the extended edge degree are included.

The representative color value (an example of color information of the present invention) is a value indicating a color that represents the divided region (hereinafter referred to as a "representative color"). For example, the representative color may be a color obtained by averaging colors in the entire divided region or may be a color occupying the largest area in the divided region. The representative color value includes a value for each basic color (primary color) of R (red), G (green), and B (blue). For example, each value of R, G, and B can be any value from 0 to 255. The system control unit 14 determines a candidate of a divided region to which a posted image is assigned by comparing the representative color value of divided regions and the representative color value of the posted image. The representative color value may be represented by, for example, the CMYK color space, the Lab color space, or the like.

The basic edge degree (an example of a first edge degree of the present invention) is a kind of edge degree and used to calculate the extended edge degree described later. The basic edge degree indicates a degree of edge included in an image itself in a divided region. The basic edge degree is calculated by the system control unit 14. First, the system control unit 14 calculates a pixel edge degree of each pixel included in the divided region. The pixel edge degree indicates the strength of the edge of the pixel itself. Specifically, the system control unit 14 calculates a difference between the value of a pixel of interest (a pixel whose pixel edge degree will be calculated) and the value of each pixel adjacent to the pixel of interest. This calculation is performed for each basic color. The pixels adjacent to the pixel of interest are eight pixels located on the left, right, top, and bottom and in the diagonal directions of the pixel of interest. The system control unit 14 calculates the pixel edge degree by summing up the differences calculated for each basic color and further summing up the differences calculated for the eight pixels. These processes are represented by the following formula 1.

$$EP(x, y) = \sum_{i=-1}^{1} \sum_{j=-1}^{1} (|R(x, y) - R(x+i, y+i)| + \quad \text{[Formula 1]}$$

$$|G(x, y) - G(x+i, y+i)| + |B(x, y) - B(x+i, y+i)|)$$

In the formula 1, x is the X coordinate of the pixel of interest based on the pixel located at the upper left corner of a region of interest (a region where the basic edge degree is calculated) and y is the Y coordinate of the pixel of interest based on the pixel located at the upper left corner of the region of interest. R(x, y), G(x, y), and B(x, y) are the pixel value of R, the pixel value of G, and the pixel value of B of a pixel located at the coordinates (x, y). EP(x, y) is the pixel edge degree of the pixel located at the coordinates (x, y). The system control unit 14 may calculate squares of the difference calculated for each basic color and sum up the calculation results instead of summing up absolute values of the differences calculated for each basic color.

Next, the system control unit 14 sums up the pixel edge degrees of all the pixels in the divided region to calculate the basic edge degree of the divided region. This process is represented by the following formula 2.

$$EB(X, Y) = \sum_{i=0}^{w-1} \sum_{j=0}^{l-1} EP(i, j) \quad \text{[Formula 2]}$$

In the formula 2, EB(X, Y) is the basic edge degree of the divided region (X, Y). Further, w is the number of horizontal pixels of the divided region and l is the number of vertical pixels of the divided region. The method for calculating the basic edge degree is not limited to the method described above. For example, when calculating the pixel edge degree, the system control unit 14 may calculate the difference between the pixel values for only four pixels located on the left, right, top, and bottom of the pixel of interest. Further, instead of calculating the difference between the pixel values for each basic color, the system control unit 14 may calculate the pixel edge degree by, for example, calculating distances between the color of the pixel of interest and the colors of pixels adjacent to the pixel of interest and summing up the distances of color.

Figures 6A, 6B:
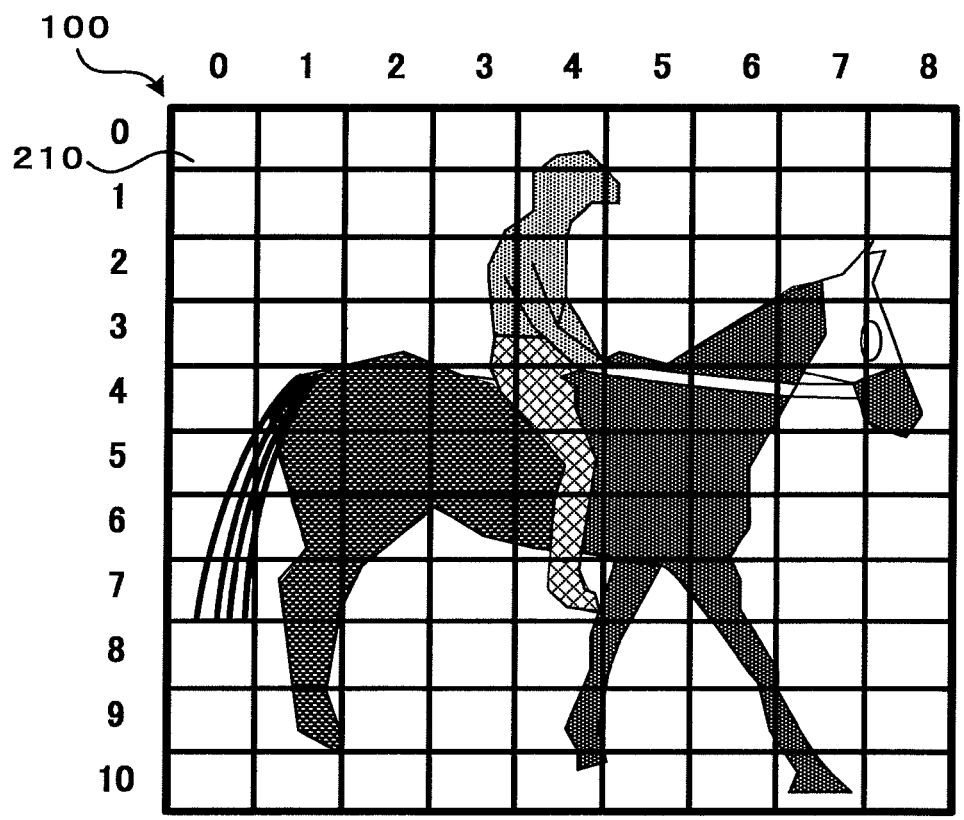
FIG. 6A is a diagram showing an example of a case in which the original image 100 is divided into 99 divided regions.
FIG. 6B is a diagram showing an example of a basic edge degree of each divided region of the original image 100.

FIGS. 6A and 6B are diagrams for explaining a calculation example of the basic edge degree. FIG. 6A is an example of a case in which the original image 100 is divided by a number of division different from that shown in FIG. 2. In FIG. 6A, the original image 100 is divided into a plurality of regions indicated by reference numeral 210. Specifically, the original image 100 is divided into 9 regions in the horizontal direction and 10 regions in the vertical direction to be a total of 90 divided regions. FIG. 6B is a diagram showing an example of the basic edge degree of each divided region of the original image 100. FIG. 6B shows normalized basic edge degrees for easy understanding of the difference of the basic edge degrees of the divided regions. As shown in FIG. 6B, the basic edge degree of a divided region that does not include edge at all is 0. On the other hand, the basic edge degree of a divided region that includes a contour of the horse or a contour of the horseman increases according to the length of the contour. In particular, the edge degree of the contour portion of the horse is high where the brightness difference from the background is large. Also, the edge degree is high in the tail portion of the horse (for example, divided regions (0, 6) and (0, 7)) which includes many lines or an arm portion of the horseman (for example, divided region (4, 3)) which has a complex pattern.

The extended edge degree (an example of a second edge degree of the present invention) is a kind of edge degree and used to determine a divided region to which a posted image is assigned. The extended edge degree is an edge degree on which the basic edge degrees of divided regions adjacent to the region of interest (the divided region where the extended edge degree is calculated) are reflected. The basic edge degree is also calculated by the system control unit 14. Specifically, the system control unit 14 sums up the basic edge degree of the region of interest and the basic edge degrees of the eight divided regions adjacent to the region of interest. Then, the system control unit 14 calculates the extended edge degree by dividing the calculated total value by the number of the divided regions whose edge degrees are summed up. In other words, the system control unit 14 calculates a simple arithmetic average of the basic edge degrees. These processes are represented by the following formula 3.

$$EE(X, Y) = \sum_{i=-1}^{1} \sum_{j=-1}^{1} EB(i, j)\frac{1}{9} \quad \text{[Formula 3]}$$

In the formula 3, $EE(X, Y)$ is the extended edge degree of the divided region $(X, Y)$. Some divided regions have only five adjacent divided regions or only three adjacent divided regions. In such cases, $\frac{1}{9}$ in the formula 3 is changed to $\frac{1}{6}$ or $\frac{1}{4}$. The reason of this is not to cause the calculated extended edge degrees to be unbalanced depending on the positions of the divided regions.

FIG. 7B is a diagram showing an example of the extended edge degree of each divided region of the original image 100 which is divided into 90 divided regions. As shown in FIG. 7A, even when a divided region has a low basic edge degree, if the basic edge degrees of divided regions surrounding the divided region are high, the extended edge degree is higher than the basic edge degree in the divided region (for example, the divided region (0, 8) of a background portion surrounded by images of the tail of the horse and the hind legs of the horse, the divided region (3, 7) of a trunk portion of the horse whose surrounding area is covered by the contour of the horse, and the like). When the system control unit 14 determines a divided region to which a posted image is assigned, the system control unit 14 preferentially determines a divided region whose extended edge degree is high as an assignment destination. Therefore, a posted image is preferentially assigned to a divided region whose basic edge degree is high and also a posted image is preferentially assigned to a divided region where surrounding divided regions have high basic edge degrees.

By the way, it can be said that $\frac{1}{9}$ in the formula 3 corresponds to a weight coefficient by which each basic edge degree is multiplied. FIG. 7B is a diagram showing a weight coefficient of a region of interest and weight coefficients of divided regions adjacent to the region of interest. As shown in FIG. 7B, in the case of formula 3, the basic edge degrees of all the divided regions are multiplied by the same weight coefficient. In other words, the weights of the basic edge degrees of all the divided regions are the same. In this case, even when the basic edge degree of the region of interest is high, if the basic edge degrees of the surrounding divided regions are low, the extended edge degree is low. On the other hand, even when the basic edge degree of the region of interest is low, if the basic edge degrees of the surrounding divided regions are high, the extended edge degree is high. Therefore, among divided regions, a posted image may be preferentially assigned to a divided region whose degree of edge included in the image is low rather than a divided region whose degree of edge included in the image is high. Therefore, the weight of the basic edge degree of the region of interest may be increased when the extended edge degree is calculated so that a posted image is preferentially assigned to a divided region whose basic edge degree is high as much as possible.

FIG. 8A is a diagram showing an example of the extended edge degrees in a case in which the weight of the basic edge degree of the region of interest is increased. FIG. 8B is a diagram showing an example of the weight coefficients in a case in which the weight of the basic edge degree of the region of interest is increased. As shown in FIG. 8B, the weight coefficient of the basic edge degree of the region of interest is assumed to be, for example, $\frac{1}{3}$. On the other hand, the weight coefficients of the other divided regions are assumed to be, for example, $\frac{1}{12}$. When all the weight coefficients are summed up, the result is 1. The calculation formula to obtain the weight coefficient is represented by the formula 4.

$$K(0, 0) = A \quad \text{[Formula 4]}$$

when $$i \neq 0 \text{ or } j \neq 0,$$

$$K(i, j) = (1 - A)\frac{1}{8}$$

In the formula 4, K is the weight coefficient and A ($=\frac{1}{3}$) is the weight coefficient of the basic edge degree of the region of interest. The extended edge degree can be calculated by the following formula 5.

$$EE(X, Y) = \sum_{i=-1}^{1} \sum_{j=-1}^{1} EB(i, j)K(i, j) \quad \text{[Formula 5]}$$

When there are only five or three divided regions adjacent to the region of interest, $\frac{1}{8}$ in the formula 4 is changed to $\frac{1}{5}$ or $\frac{1}{3}$. Therefore, when there are only five divided regions adjacent to the region of interest, the weight coefficient of the basic edge degree of the region of interest is $\frac{1}{3}$ and the weight coefficients of the other divided regions are $\frac{2}{15}$. When there are only three divided regions adjacent to the region of interest, the weight coefficient of the basic edge degree of the region of interest is $\frac{1}{3}$ and the weight coefficients of the other divided regions are $\frac{2}{9}$. In this way, the rate by which weight coefficient of the basic edge degree of the region of interest contributes to the extended edge degree is constant.

The method for applying the weight corresponding to each basic edge degree is not limited to the method described above.

The method for calculating the extended edge degree, is not limited to the method described above. For example, the system control unit 14 may calculate an arithmetic average of the basic edge degrees by summing up the basic edge degree of the region of interest and only the basic edge degrees of the four divided regions located on the left, right, top, and bottom of the pixel of interest.

FIG. 5D is a diagram showing an example of content registered in the posted image DB 12c according to the embodiment. In the posted image DB 12c, posted images and information related to the posted images are registered. Specifically, in the posted image DB 12c, a mosaic image ID, the number of posted images, and posted image information are registered. The mosaic image ID is identification information of a mosaic image generated by using the registered posted images as materials. The number of posted images is the number of posted images acquired so far from the user terminal 2. The number of pieces of posted image information to be registered is equal to the number of posted images.

FIG. 5E is a diagram showing an example of content included in the posted image information. As shown in FIG. 5E, in the posted image information, an image number, a user ID, posted image data, and a representative color value are included in association with each other. The image number is a number given to the posted image. An image number is given to each posted image in posting order (in an order in which the mosaic image providing server 1 acquires the posted images). The user ID included in the posted image information is a user ID of a user who posted the posted image. In other words, the user ID included in the posted image information is a user ID of a user who uses the user terminal 2 from which the posted image is acquired. The posted image data is image data of the posted image. The representative color value is a value indicating a representative color of the posted image. Content of the representative color value of the posted image is the same as the content of the representative color value of a divided region.

FIG. 5F is a diagram showing an example of content registered in the mosaic image DB 12d according to the embodiment. In the mosaic image DB 12d, information related to the mosaic image is registered. Specifically, in the mosaic image DB 12d, a mosaic image ID, an original image ID, a plurality of assignment image numbers, and mosaic image display data are registered in association with each mosaic image. The mosaic image ID is identification information of the mosaic image. The original image ID is an original image ID of an image of a picture of the mosaic image. The assignment image number is an image number of a posted image assigned to a divided region. The number of the assignment image numbers to be registered is equal to the number of division of the original image. Each assignment image number is registered in association with an index of a corresponding divided region. An invalid number such as −1 is set to an assignment image number of a divided region to which a posted image has not yet been assigned (hereinafter referred to as an "unassigned region").

The mosaic image display data is data for displaying the mosaic image in a Web page. In other words, the mosaic image display data represents display content of the mosaic image. In the embodiment, the mosaic image is represented as a table in which a posted image is inserted in each cell. For example, the mosaic image display data is data described in a markup language such as HTML (Hyper Text Markup Language), XML (Extensible Markup Language), and XHTML (Extensible Hyper Text Markup Language). The mosaic image display data forms a part of an HTML document of a Web page in which the mosaic image is displayed. The system control unit 14 transmits the HTML document including the mosaic image display data to the user terminal 2, so that the system control unit 14 causes the mosaic image to displayed by the user terminal 2 on the basis of the HTML document. Specifically, the user terminal 2 displays a posted image in each cell of the table according to the description content of the mosaic image display data included in the HTML document, so that the user terminal 2 displays the mosaic image in the Web page. In the embodiment, the user terminal 2 generates (forms) the mosaic image on a screen.

In the mosaic image display data, for example, the table is defined by a table tag, a tr gag, a td tag, and the like. An img tag of, for example, <img src="href="http://www.yyy.zzz/9876543210-0123.jpeg"> is inserted between a td start tag and a td end tag which represent a cell. Here, "http://www.yyy.zzz/9876543210-0123.jpeg" is an URL (Uniform Resource Locator) of the posted image data. "9876543210" is the original image ID. "0123" is the image number of the posted image. In this way, in a cell corresponding to a divided region to which a posted image is assigned, an img tag including the URL of the assigned posted image is inserted. The URL may be a URL of image data of a thumbnail of the posted image. In the mosaic image, normally, a posted image is displayed in a size smaller than the original display size. Therefore, image data of a thumbnail obtained by reducing the numbers of vertical and horizontal pixels of the posted image and reducing the display size may be transmitted to the user terminal 2 which displays the mosaic image. In this case, for example, when the system control unit 14 registers posted image data in the posted image DB 12c, the system control unit 14 generates image data of a thumbnail of the posted image on the basis of the posted image data and registers the image data of the thumbnail in the posted image DB 12c.

Content of the assignment image number registered in the mosaic image DB 12d is reflected on the mosaic image display data. Therefore, in the mosaic image DB 12d, only either one of the assignment image number and the mosaic image display data may be registered. If only the assignment image number is registered, when the system control unit 14 transmits a Web page in which the mosaic image is displayed, the system control unit 14 may generate the mosaic image display data on the basis of the assignment image number.

Next, other information stored in the storage unit 12 will be described. The storage unit 12 stores various data such as an HTML documents for displaying a Web pages, an XML documents, image data, text data, and an electronic documents. Also, the storage unit 12 stores various setting values set by an administrator and the like. The setting values include a threshold value to determine whether or not the color of posted image is similar to the color of divided region.

Also, the storage unit 12 stores various programs such as an operating system, a WWW (World Wide Web) server program, a DBMS (DataBase Management System), and a mosaic image providing program. The mosaic image providing program is a program for performing processes related to the mosaic image such as registering the original image, acquiring a posted image, generating the mosaic image display data. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (RandomAccess Memory) 14c, and the like. In the system control unit 14, the CPU 14a reads and executes various programs, so that the system control unit 14 functions as an image acquisition means, a candidate determination means, an edge degree acquisition means, an assignment determination means, a first calculation means, a second calculation means, a color information acquisition means, and a presentation means of the present invention.

The mosaic image providing server 1 may include a plurality of server devices. For example, a server device that performs processes related to registering the original image, acquiring a posted image, and generating the mosaic image display data, a server device that transmits a Web page in response to a request from the user terminal 2, a server device that manages databases, and the like may be connected to each other by a LAN or the like.

3. Operation of Mosaic Image Providing System

Next, an operation of the mosaic image providing system S will be described with reference to FIGS. 9 to 11.

Figure 9:
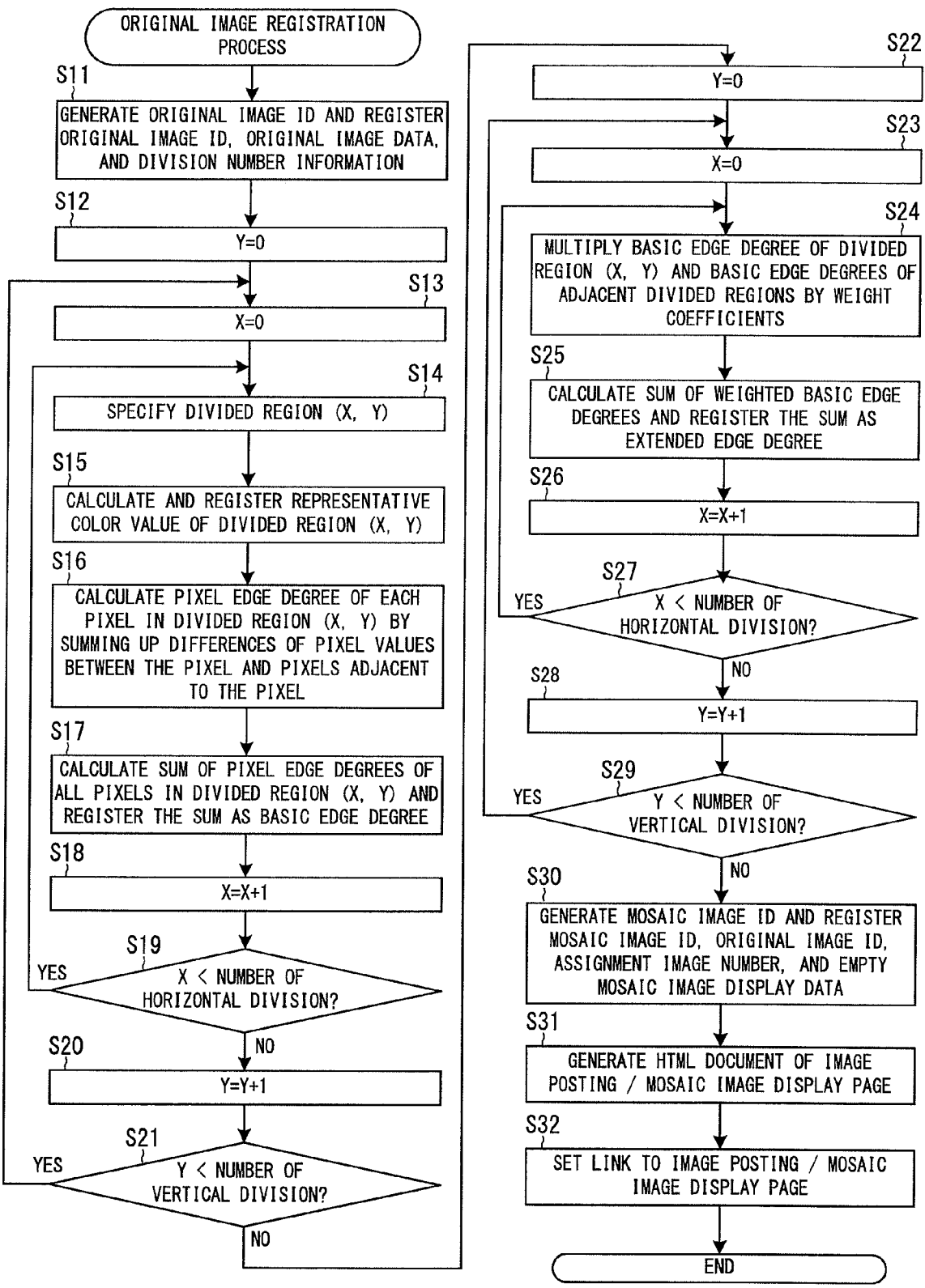
FIG. 9 is a flowchart showing a process example of an original image registration process of a system control unit 14 of the mosaic image providing server 1 according to the embodiment.

FIG. 9 is a flowchart showing a process example of an original image registration process of the system control unit 14 of the mosaic image providing server 1 according to the embodiment. FIG. 9 shows a process example in a case in which, when calculating the extended edge degree, the weight of the basic edge degree of the region of interest is set to be greater than the weight of the basic edge degree of the divided regions adjacent to the region of interest.

For example, an administrator of the mosaic image providing server 1 registers the original image by operating a management terminal device connected to the mosaic image providing server 1. Specifically, the administrator selects the original image and inputs the number of horizontal division and the number of vertical division. Then, the management terminal device transmits an original image registration request including the original image, the number of horizontal division, and the number of vertical division to the mosaic image providing server 1. For example, also a user may post the original image. In this case, the user terminal 2 of the user who posts the original image transmits the original image registration request.

The original image registration process is started when the mosaic image providing server 1 receives the original image registration request. The original image registration process is previously performed before a posted image reception process described later. After the original image registration process is performed, assignment of a posted image and the like in the posted image reception process can be performed.

In the original image registration process, the system control unit 14 generates a new original image ID. Next, the system control unit 14 generates the division number information based on the number of horizontal division and the number of vertical division included in the received original image registration request. Then, the system control unit 14 registers the new original image ID, the original image data included in the original image registration request, and the generated division number information into the original image DB 12b in association with each other (step S11). The system control unit 14 puts a bitmap image of the original image in the RAM 14c on the basis of the original image data.

Next, the system control unit 14 divides the original image. First, the system control unit 14 sets the index Y of the divided region to 0 (step S12). Next, the system control unit 14 sets the index X of the divided region to 0 (step S13). Next, the system control unit 14 specifies the divided region (X, Y) (step S14). Specifically, the system control unit 14 acquires the numbers of vertical and horizontal pixels of the original image from the registered original image data. Next, the system control unit 14 calculates a coordinate range of the pixels included in the divided region (X, Y) on the basis of the numbers of vertical and horizontal pixels of the original image and the numbers of vertical division and horizontal division indicated by the registered division number information.

Next, the system control unit 14 calculates the representative color value of the divided region (X, Y) (step S15). For example, the system control unit 14 acquires values of the pixels included in the divided region (X, Y) from the bitmap image of the original image which is put in the RAM 14c. Next, the system control unit 14 sums up the acquired pixel values for each basic color R, G, and B. Next, the system control unit 14 divides the sum of the pixel values by a total number of pixels included in the divided region (X, Y) for each basic color. The averages of the pixel values obtained by the above calculation for each basic color are the representative color value. Next, the system control unit 14 registers the calculated representative color value into the original image DB 12b in association with the new original image ID and the indexes X and Y of the divided region.

Next, the system control unit 14 calculates the pixel edge degree of each pixel included in the divided region (X, Y) (step S16). Specifically, the system control unit 14 acquires values of the pixels included in the divided region (X, Y) from the bitmap image of the original image which is put in the RAM 14c. Then, the system control unit 14 calculates the pixel edge degrees by the calculation method indicated by the formula 1.

Next, as the first calculation means, the system control unit 14 calculates the basic edge degree of the divided region (X, Y) on the basis of the calculated pixel edge degrees (step S17). For example, the system control unit 14 calculates the basic edge degree by the calculation method indicated by the formula 2. Then, the system control unit 14 registers the calculated basic edge degree into the original image DB 12b in association with the new original image ID and the indexes X and Y of the divided region.

Next, the system control unit 14 adds 1 to the index X (step S18). Next, the system control unit 14 determines whether or not the index X is smaller than the number of horizontal division (step S19). At this time, if the system control unit 14 determines that the index X is smaller than the number of horizontal division (step S19: YES), the system control unit 14 proceeds to step S14. On the other hand, if the system control unit 14 determines that the index X is not smaller than the number of horizontal division (step S19: NO), the system control unit 14 adds 1 to the index Y (step S20). Next, the system control unit 14 determines whether or not the index Y is smaller than the number of vertical division (step S21). At this time, if the system control unit 14 determines that the index Y is smaller than the number of vertical division (step S21: YES), the system control unit 14 proceeds to step S13. The system control unit 14 repeats the processes from step S13 to step S21, so that the system control unit 14 registers the representative color value and the basic edge degree of each divided region.

If the system control unit 14 determines that the index Y is not smaller than the number of vertical division (step S21: NO), the system control unit 14 sets the index Y to 0 (step S22). Next, the system control unit 14 sets the index X to 0 (step S23).

Next, as the second calculation means, the system control unit 14 multiplies the basic edge degree of the divided region (X, Y) and the basic edge degrees of the eight divided regions adjacent to the divided region (X, Y) by weight coefficients respectively (step S24). At this time, the system control unit 14 performs the above calculation so that the weight coefficient by which the basic edge degree of the divided region (X, Y) is multiplied is greater than the weight coefficient by which the basic edge degrees of the divided regions adjacent to the divided region (X, Y) are multiplied.

Next, as the second calculation means, the system control unit 14 calculates the extended edge degree of the divided region (X, Y) by summing up the basic edge degrees weighted by being multiplied by the weight coefficients (step S25). Specifically, in steps S24 and S25, the system control unit 14 calculates the extended edge degree by the calculation method indicated by the formula 5. Then, the system control unit 14 registers the calculated extended edge degree into the original image DB 12b in association with the new original image ID and the indexes X and Y of the divided region.

Next, the system control unit 14 adds 1 to the index X (step S26). Next, the system control unit 14 determines whether or not the index X is smaller than the number of horizontal division (step S27). At this time, if the system control unit 14 determines that the index X is smaller than the number of horizontal division (step S27: YES), the system control unit 14 proceeds to step S24. On the other hand, if the system control unit 14 determines that the index X is not smaller than the number of horizontal division (step S27: NO), the system control unit 14 adds 1 to the index Y (step S28). Next, the system control unit 14 determines whether or not the index Y is smaller than the number of vertical division (step S29). At this time, if the system control unit 14 determines that the index Y is smaller than the number of vertical division (step S29: YES), the system control unit 14 proceeds to step S23. The system control unit 14 repeats the processes from step S23 to step S29, so that the system control unit 14 registers the extended edge degree of each divided region.

If the system control unit 14 determines that the index Y is not smaller than the number of vertical division (step S29: NO), the system control unit 14 generates a new mosaic image ID. Next, the system control unit 14 registers the new mosaic image ID and the original image ID into the mosaic image DB 12d in association with each other. Also, the system control unit 14 registers a number indicating that no posted image is assigned as the assignment image number of each divided region into the mosaic image DB 12d in association with the new mosaic image ID and the original image ID. Also, the system control unit 14 registers empty mosaic image display data into the mosaic image DB 12d in association with the new mosaic image ID and the original image ID (step S30). The empty mosaic image display data is mosaic image display data in which an img tag including the URL of the posted image data is not included at all.

Next, the system control unit 14 generates an HTML document of an image posting/mosaic image display page 400 (step S31). The image posting/mosaic image display page 400 is a Web page from which an image is posted and on which a mosaic image is displayed. The system control unit 14 causes the storage unit 12 to store the generated HTML document. Next, the system control unit 14 sets a hyper link to the generated HTML document (step S32). For example, the system control unit 14 adds the a tag including the URL of the HTML document of the image posting/mosaic image display page 400 to the HTML document of the top page of the Web site of the mosaic image providing system S.

Thereby, an image can be posted by a user and the mosaic image can be browsed by the user. When the system control unit 14 completes the process of step S32, the system control unit 14 ends the original image registration process.

Figure 10:
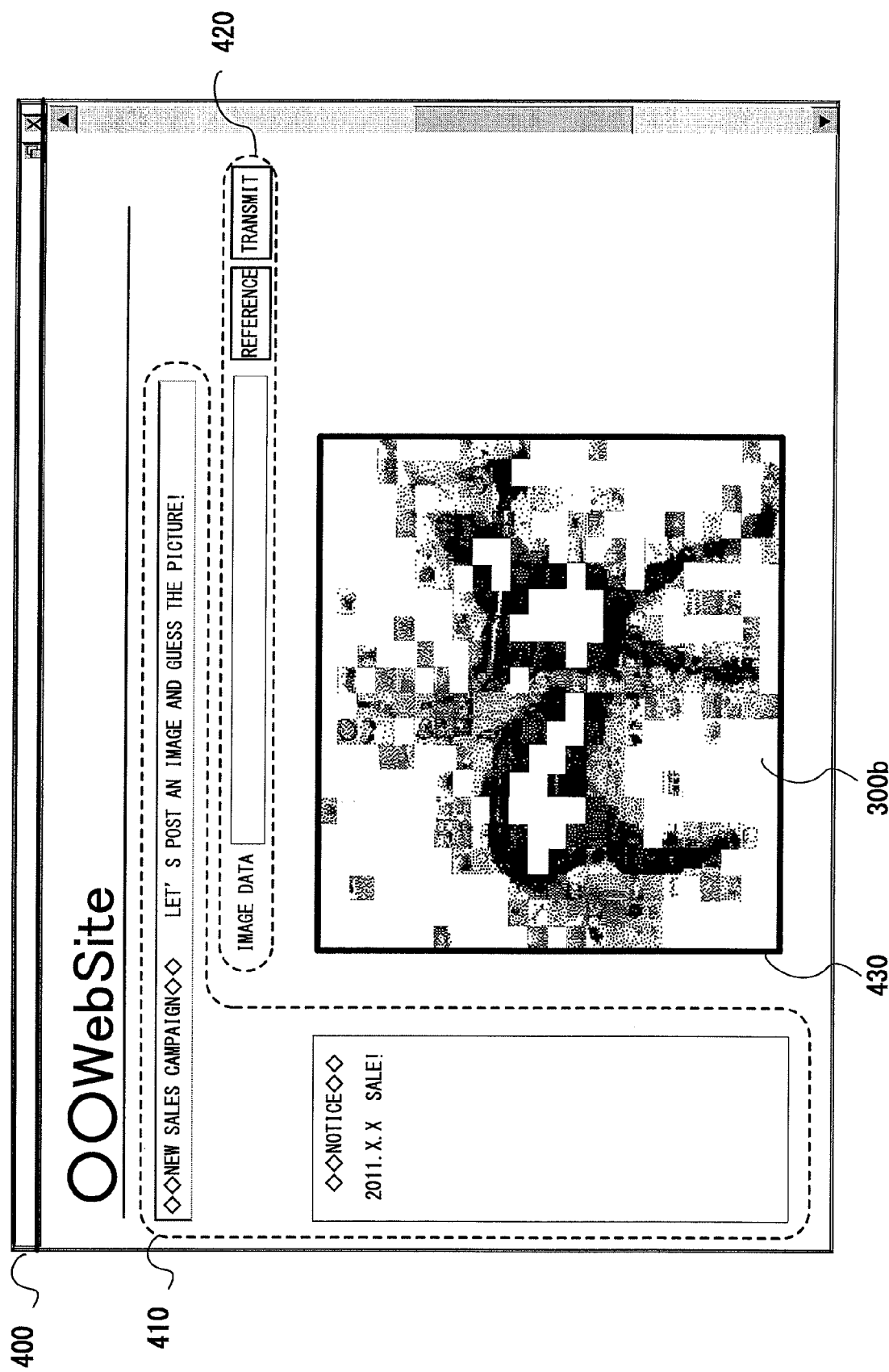
FIG. 10 is a diagram showing a screen display example of an image posting/mosaic image display page 400 according to the embodiment.

FIG. 10 is a diagram showing a screen display example of the image posting/mosaic image display page 400 according to the embodiment. As shown in FIG. 10, the image posting/mosaic image display page 400 includes a message portion 410, a posted image transmission portion 420, a mosaic image display portion 430, and the like. In the message portion 410, for example, information such as a notice related to an item for sale, a service, and the like in a site related to the mosaic image providing system S is displayed. In the posted image transmission portion 420, various widgets for posting an image are displayed. For example, an input field for specifying a path name of the posted image data, a reference button for displaying a dialog for selecting posted image data from the image data stored in the user terminal 2, a transmission button for transmitting the posted image data, and the like are displayed. In the mosaic image display portion 430, a mosaic image generated by images posted so far is displayed. In FIG. 10, a mosaic image 300b is displayed as an example. If no image is posted after the original image registration process is completed, no mosaic image is displayed in the mosaic image display portion 430.

When any one of the posted images included in the mosaic image displayed in the mosaic image display portion 430 is selected by a user, for example, the selected posted image may be enlarged and displayed in the image posting/mosaic image display page 400 or information related to a user who posted the selected posted image (for example, a nickname and a profile of the user) may be displayed in the image posting/mosaic image display page 400. When displaying the information related to a user who posted the selected posted image, for example, the system control unit 14 inserts the user ID of the user who posted the selected posted image into the mosaic image display data when inserting the img tag into the mosaic image display data. When a user selects any one of the posted images in the mosaic image display portion 430, the user terminal 2 transmits a request including the user ID of the user who posted the selected posted image. The request is transmitted to the mosaic image providing server 1. The system control unit 14 acquires necessary information from user information corresponding to the user ID included in the received request and transmits the information to the user terminal 2. Then, the user terminal 2 displays the received information.

Figure 11:
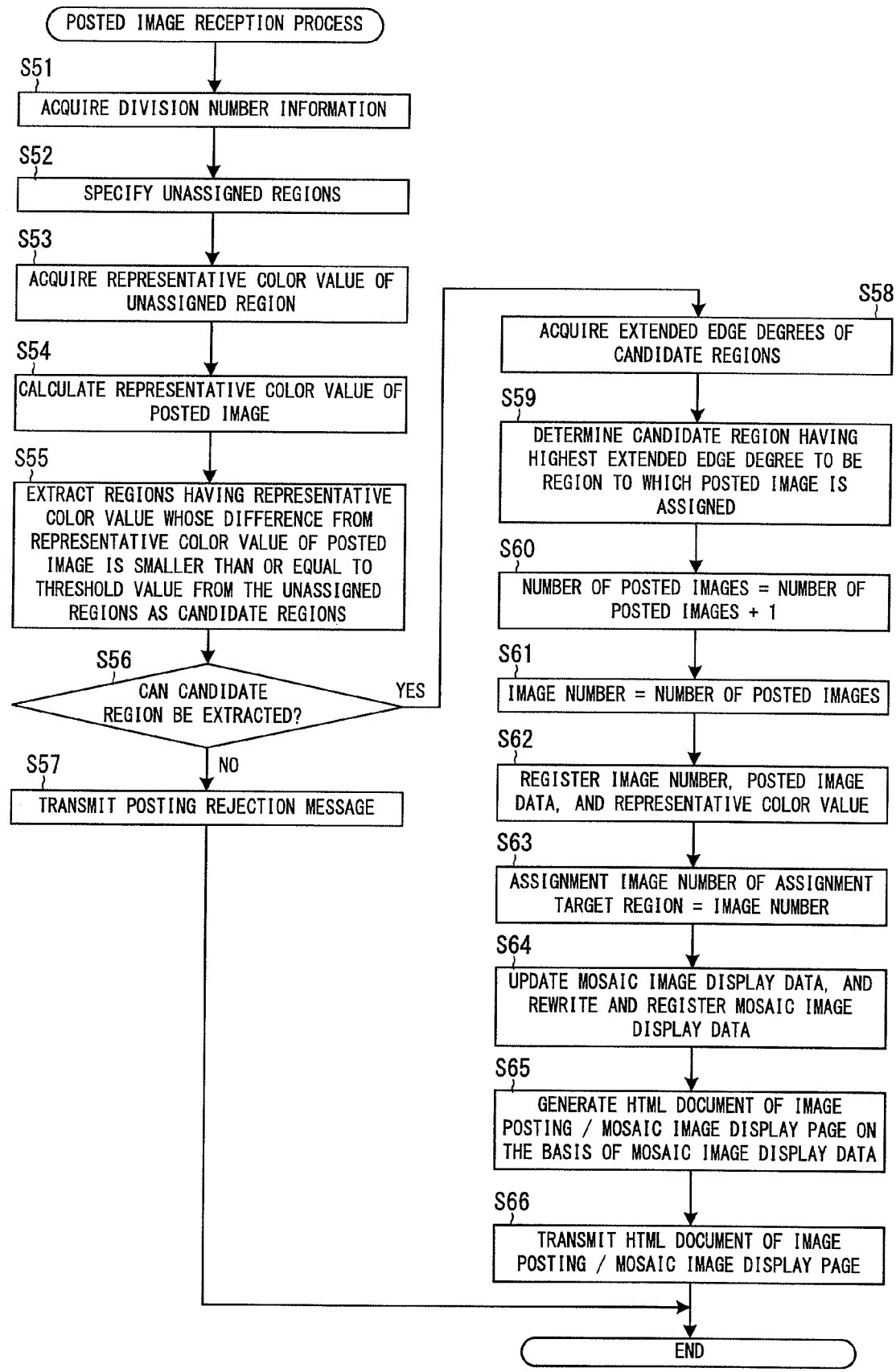
FIG. 11 is a flowchart showing a process example of a posted image reception process of the system control unit 14 of the mosaic image providing server 1 according to the embodiment.

FIG. 11 is a flowchart showing a process example of the posted image reception process of the system control unit 14 of the mosaic image providing server 1 according to the embodiment. When a user specifies posted image data and selects the transmission button in the posted image transmission portion 420 in the image posting/mosaic image display page 400, the user terminal 2 transmits a posting request to the mosaic image providing server 1. The posting request includes the specified posted image data, the user ID of the user who performed the operation, and the mosaic image ID of the mosaic image to be generated. The posted image reception process is started when the mosaic image providing server 1, as the image acquisition means, receives the posting request.

First, the system control unit 14 acquires an original image ID (hereinafter referred to as a "target original image ID") corresponding to the mosaic image ID (hereinafter referred to as a "target mosaic image ID") included in the posting request from the mosaic image DB 12d. Next, the system control unit 14 acquires the division number information corresponding to the target original image ID from the original image DE 12b (step S51). Next, the system control unit 14 acquires image assignment numbers corresponding to the target mosaic image ID from the mosaic image DB 12d on the basis of the number of horizontal division and the number of vertical division included in the acquired division number information. Then, the system control unit 14 specifies unassigned regions on the basis of the acquired image assignment numbers (step S52). Next, as the color information acquisition means, the system control unit 14 acquires a representative color value from the divided region information of the unassigned regions in the divided region information registered in the original image DB 12b in association with the target original image ID (step S53).

Next, as the color information acquisition means, the system control unit 14 calculates the representative color value of the posted image (hereinafter referred to as a "posted image to be processed") indicated by the posted image data included in the posting request (step S54). This calculation method is the same as that in step S15 in the original image registration process.

Here, the system control unit 14 performs exclusive control using, for example, mutex or the like, and when acquiring a right to perform a process of step S55 and the following processes (critical session), the system control unit 14 performs a lock operation. Thereby, the system control unit 14 prevents a plurality of processes from performing a critical session at the same time.

Next, as the candidate determination means, the system control unit 14 extracts divided regions having a representative color value whose difference from the representative color value of the posted image to be processed is smaller than or equal to a threshold value from the unassigned regions as candidate regions being candidates for a region to which the posted image to be processed is assigned (step S55). Specifically, the system control unit 14 calculates the difference by the following formula 6.

$$\text{Diff}=(R_1-R_2)^2+(G_1-G_2)^2+(B_1-B_2)^2 \quad \text{[Formula 6]}$$

In the formula 6, Diff is the difference. R1, G1, and B1 are representative color values of R, G, and B in a divided region. R2, G2, and B2 are representative color values of R, G, and B in the posted image to be processed. The system control unit 14 performs this calculation on all the unassigned regions. The system control unit 14 determines a divided region whose calculated difference is smaller than or equal to the threshold value to be a candidate region. The system control unit 14 may calculate absolute values of the difference calculated for each basic color and sum up the absolute values instead of calculating squares of the difference calculated for each basic color and summing up the calculation results.

Next, the system control unit 14 determines whether or not one or more candidate regions can be extracted (step S56). When the system control unit 14 determines that no candidate region can be extracted (step S56: NO), the system control unit 14 transmits a posting rejection message to the user terminal 2 which is the transmission source of the posting request (step S57). The posting rejection message is a message indicating that the posting of the image is rejected. The user terminal 2 displays the received posting rejection message on a screen. When the system control unit 14 completes the process of step S57, the system control unit 14 ends the posted image reception process.

On the other hand, when the system control unit 14 determines that one or more candidate regions can be extracted (step S56: YES), as the edge degree acquisition means, the system control unit 14 acquires extended edge degrees from the divided region information of the extracted candidate regions in the divided region information registered in the original image DB 12b in association with the target original image ID (step S58). Next, as the assignment determination means, the system control unit 14 determines a candidate region having the highest extended edge degree among the extracted candidate regions to be the divided region to which the posted image to be processed is assigned (hereinafter referred to as an "assignment target region") (step S59).

Next, the system control unit 14 updates the number of posted images by adding 1 to the number of posted images registered in the posted image DB 12c in association with the target mosaic image ID (step S60). Next, the system control unit 14 sets the image number of the posted image to be processed to the updated number of posted images (step S61). Next, the system control unit 14 registers the image number, the user ID and the posted image data included in the posting request, and the posted image information including the representative color value of the posted image to be processed into the posted image DB 12c in association with the target mosaic image ID (step S62).

Next, the system control unit 14 rewrites the assignment image number of the assignment target region registered in the mosaic image DB 12d in association with the target mosaic image ID to the image number of the posted image to be processed (step S63).

Next, the system control unit 14 updates the mosaic image display data registered in the mosaic image DB 12d in association with the target mosaic image ID (step S64). Specifically, in the mosaic image display data, the system control unit 14 inserts an img tag including the URL of the posted image data of the posted image to be processed into a cell corresponding to the index of the assignment target region.

Next, the system control unit 14 generates an HTML document of the image posting/mosaic image display page 400 including the updated mosaic image display data and stores the HTML document into the storage unit 12 (step S65). Next, the system control unit 14 transmits the generated HTML document to the user terminal 2 that is the transmission source of the posting request (step S66). Here, the system control unit 14 performs an unlock operation to allow other processes to perform the critical session. When the system control unit 14 completes this process, the system control unit 14 ends the posted image reception process.

The user terminal 2 displays the image posting/mosaic image display page 400 on a screen on the basis of the received HTML document. At this time, the system control unit 14 transmits a request including the URL of the posted image data to the mosaic image providing server 1 on the basis of the img tag included in the mosaic image display data. The system control unit 14 acquires the mosaic image ID and the image number from the URL included in the received request. Next, the system control unit 14 acquires the posted image data corresponding to the acquired mosaic image ID and the image number from the posted image DB 12c. Next, the system control unit 14 transmits the acquired posted image data to the user terminal 2. The user terminal 2 displays the posted image in the mosaic image display portion 430 in the image posting/mosaic image display page 400 on the basis of the acquired posted image data. Thereby, for example, the mosaic image as shown in FIG. 10 is displayed. In this way, the system control unit 14 transmits the mosaic image display data, so that, as the presentation means, the system control unit 14 causes the mosaic image to be displayed to the user by the user terminal 2 to present.

As described above, according to the embodiment, the system control unit 14 of the mosaic image providing server 1 acquires a posted image specified by a user, determines candidate regions to be candidates for a region to which the acquired image is assigned on the basis of the representative color value of the acquired posted image and the representative color values of the divided regions, acquires the edge degrees of the candidate regions, determines a divided region to which the acquired posted image is assigned from the candidate regions, and causes a mosaic image in which the acquired posted image is placed to be displayed to the user on the basis of the determined assignment.

Therefore, the divided region to which the posted image is assigned is determined on the basis of the edge degrees of the divided regions which are determined to be the candidate regions, so that it is possible to preferentially assign the posted image to a divided region which contributes to improve the recognizability of the picture of the original image. Therefore, it is possible to present a mosaic image having high recognizability of the picture of the original image even when the mosaic image is in an uncompleted state.

The system control unit 14 calculates the extended edge degree that indicates the degree of an edge in a region of interest on the basis of the basic edge degree of the region of interest and the basic edge degrees of the divided regions adjacent to the region of interest so that the higher the basic edge degrees are, the higher the extended edge degree is, and determines a divided region to which the acquired posted image is assigned on the basis of the extended edge degrees in the divided regions that are determined to be the candidate regions.

Therefore, it is possible to preferentially assign the posted images to a divided region including an image which contributes to improve the recognizability of the picture of the original image and the divided regions adjacent to the divided region. Therefore, the posted images are assigned to these divided regions, so that the recognizability of the picture of the original image can be further improved.

The system control unit 14 calculates the extended edge degree by weighting the basic edge degrees of the divided regions adjacent to the region of interest so that the weight of the basic edge degree of the region of interest is greater than the weight of the basic edge degrees of the adjacent divided regions.

Therefore, while the posted images are preferentially assigned to a divided region including an image which contributes to improve the recognizability of the picture of the original image and the divided regions adjacent to the divided region, it is possible to more preferentially assign the posted image to the divided region including the image which contributes to improve the recognizability of the picture of the original image. Therefore, the recognizability of the picture of the original image can be further improved.

In step S55 of the posted image reception process in the embodiment described above, the mosaic image providing server 1 calculates the difference of the representative color value between the posted image and all the divided regions to which no posted image is assigned. However, it is possible to reduce the number of divided regions where the calculation is performed and reduce the calculation time by rearranging the divided regions in advance on the basis of the representative color values. For example, the system control unit 14 generates a list indicating the divided regions in ascending order of the representative color values of R, a list indicating the divided regions in ascending order of the representative color values of G, and a list indicating the divided regions in ascending order of the representative color values of B. When the system control unit 14 receives a posted image and calculates the representative value of the posted image, the system control unit 14 calculates the minimum value and the maximum value of the representative value where the difference from the representative value of the posted image is smaller than or equal to a threshold value for each of R, G, and B. The threshold value at this time may be different from the threshold value used to calculate the difference by the formula 6. Next, the system control unit 14 specifies a range of the divided regions where the difference of the representative value from that of the posted image is smaller than or equal to the threshold value by using the generated lists by, for example, a binary search method. The system control unit 14 performs the above process for each of R, G, and B. The system control unit 14 determines divided regions where the difference of the representative value from that of the posted image is smaller than or equal to the threshold value in all of R, G, and B to be the candidate regions.

In the embodiment described above, the mosaic image providing server 1 uses the extended edge degree obtained by increasing the weight of the basic edge degree of the region of interest as an edge degree to determine the divided region to which the posted image is assigned. However, the mosaic image providing server 1 may use, for example, an extended edge degree which is a simple arithmetic average of the basic edge degrees or may use the basic edge degree itself.

In the embodiment described above, the mosaic image providing server 1 determines a candidate region having the highest edge degree among the candidate regions to which the posted image is assigned to be the assignment target region. However, while the mosaic image providing server 1 preferentially assigns the posted image to a candidate region having a high edge degree, the mosaic image providing server 1 may assign the posted image to a divided region other than the candidate region having the highest edge degree. For example, the system control unit 14 generates a list indicating the divided regions in descending order of the edge degrees in the original image registration process. Next, the system control unit 14 determines that the divided regions of the highest edge degree to the Nth highest edge degree (N is a predetermined number) are priority regions to which the posted image is preferentially assigned. How many divided regions are set to be the priority regions (that is, N) may be determined according to, for example, the number of division of the original image. For example, when the number of division of the original image is 480 and 20% of all the divided regions are set to be the priority regions, the divided regions of the highest edge degree to the 96th highest edge degree are set to be the priority regions. When there are one or more priority regions in the candidate regions, the system control unit 14 may assign the posted image to any priority region in the priority regions. For example, the system control unit 14 may assign the posted image to a priority region where the difference of the representative color value from that of the posted image is the smallest. When there is no priority region in the candidate regions, for example, the system control unit 14 may assign the posted image to a candidate region having the highest edge degree or may assign the posted image to a candidate region where the difference of the representative color value from that of the posted image is the smallest.

In the embodiment described above, the mosaic image providing server 1 assigns one posted image to one divided region. However, the mosaic image providing server 1 may assign one posted image to a plurality of divided regions. For example, the mosaic image providing server 1 may assign the same posted image to a predetermined number of candidate regions in descending order of the edge degrees from the candidate region having the highest edge degree.

In the embodiment described above, the mosaic image providing server 1 extracts the candidate regions being candidates for a region to which the posted image is assigned from the unassigned regions. However, the mosaic image providing server 1 may extract the candidate regions from divided regions to which a posted image has already been assigned. For example, in the embodiment described above, when a plurality of candidate regions is extracted, the posted image is assigned to a candidate region having the highest edge degree among the candidate regions. Therefore, each posted image may not be assigned to a candidate region which has a color most similar to that of the posted image. Therefore, there is a possibility that a posted image that has already been assigned to a divided region can be moved to another divided region which has a color more similar to that of the posted image. Therefore, for example, when a color of the posted image to be processed, which is tried to be assigned to a divided region, is more similar to the color of the divided region than the color of the posted image which has already been assigned to the divided region (hereinafter referred to as an "assigned image"), and a divided region whose color is more similar to the color of the assigned image is empty, the mosaic image providing server 1 may assign the assigned image to the empty divided region and assign the posted image to be processed to the divided region to which the assigned image has been assigned so far.

Specifically, the system control unit 14 extracts the divided regions where the difference of the representative color value from that of the posted image to be processed is smaller than or equal to the threshold value as the candidate regions regardless of whether or not a posted image has already been assigned. Next, if the candidate region having the highest edge degree is an unassigned region, the system control unit 14 determines the candidate region to be the assignment target region. On the other hand, if the candidate region having the highest edge degree is a divided region to which a posted image has already been assigned, the system control unit 14 determines whether or not the posted image assigned to the divided region can be moved. For example, the system control unit 14 determines whether or not the difference between the representative color value of the candidate region having the highest edge degree and the representative color value of the posted image to be processed is smaller than the difference between the representative color value of the candidate region having the highest edge degree and the representative color value of the assigned image. At this time, if the difference between the representative color value of the candidate region having the highest edge degree and the representative color value of the posted image to be processed is smaller, the system control unit 14 extracts divided regions where the difference of the representative color value from that of the assigned image is smaller than the difference between the representative color value of the candidate region having the highest edge degree and the representative color value of the assigned image from the candidate regions to which no posted image is assigned. At this time, when the system control unit 14 can extract one or more divided regions, the system control unit 14 determines a divided region having the highest edge degree among the extracted divided regions to be the assignment target region of the assigned image. Also, the system control unit 14 determines the candidate region having the highest edge degree to be the assignment target region of the posted image to be processed. On the other hand, if the difference between the representative color value of the candidate region having the highest edge degree and the representative color value of the posted image to be processed is greater than or equal to the difference between the representative color value of the candidate region having the highest edge degree and the representative color value of the assigned image or if the system control unit 14 cannot extract a divided region where the difference of the representative color value from that of the assigned image is smaller than the difference between the representative color value of the candidate region having the highest edge degree and the representative color value of the assigned image, the system control unit 14 performs the same process on a candidate region having the second highest edge degree. In this way, the system control unit 14 repeatedly performs the process until the assignment target region of the posted image to be processed is determined.

In the embodiment described above, the mosaic image providing server 1 transmits the HTML document including the mosaic image display data to the user terminal 2 to cause the mosaic image to be displayed by the user terminal 2 However, the mosaic image providing server 1 may transmit image data of the mosaic image to the user terminal 2 without change. In this case, for example, the mosaic image providing server 1 generates image data of the mosaic image in which each posted image is placed to a position of an assigned region on the basis of the posted image data which have been acquired so far and registered in the posted image DB 12c and the assignment image numbers registered in the mosaic image DB 12d.

In the embodiment described above, the mosaic image providing server 1 can use images posted from a plurality of users to generate display data of one mosaic image. However, for example, the mosaic image providing server 1 may generate display data of the mosaic image by using only images posted from one user.

In the embodiment described above, the mosaic image providing server 1 includes the image acquisition means, the candidate determination means, the edge degree acquisition means, the assignment determination means, the presentation means, and the like, and the mosaic image providing server 1 transmits display data to the user terminal 2, so that the mosaic image providing server 1 causes the mosaic image to be displayed by the user terminal 2. However, for example, a device such as the user terminal 2 may include the image acquisition means, the candidate determination means, the edge degree acquisition means, the assignment determination means, the presentation means, and the like, and the device such as the user terminal 2 may calculate the edge degree, assign the posted image, generate the mosaic image, and causes the mosaic image to be displayed by a display in stand-alone mode.

REFERENCE SIGNS LIST

1 Mosaic image providing server
2 User terminal
11 Communication unit
12 Storage unit
12a Member information DB
12b Original image DB
12c Posted image DB
12d Mosaic image DB
13 Input/output interface
14 System control unit
14a CPU
14b ROM
14c RAM
15 System bus
NW Network
S Mosaic image providing system

The invention claimed is:

1. An image providing device for providing a mosaic image of an original image divided into a plurality of regions, the image providing device comprising:
   an image acquisition unit that acquires an image specified by a user;
   a candidate determination unit that, on the basis of color information of the acquired image and color information of the plurality of regions of the original image, determines a set of candidate regions among the plurality of regions to be candidates for an assignment region to which the acquired image is assigned;
   an edge degree acquisition unit that acquires edge degrees indicating degrees of edges in the set of candidate regions determined as the candidates;
   an assignment determination unit that, on the basis of the acquired edge degrees, determines the assignment region among the set of candidate regions to which the acquired image is assigned and the acquired image is preferentially placed at the assignment region; and
   a presentation unit that outputs a mosaic image, in which, the acquired image is placed on the basis of the assignment region determined by the assignment determination unit.

2. The image providing device according to claim 1, further comprising:
   a first calculation unit that calculates a first edge degree indicating a degree of an edge included in the plurality of regions of the original image,
   wherein the edge degree acquisition unit acquires the calculated first edge degree as the edge degree.

3. The image providing device according to claim 2, further comprising:
   a second calculation unit that calculates a second edge degree indicating a degree of an edge in a certain region on the basis of the first edge degree of the certain region and the first edge degree of the regions adjacent to the certain region, the second calculation unit calculating the second edge degree so that the higher the first edge degree is, the higher the second edge degree is,
   wherein the edge degree acquisition unit acquires the calculated second edge degree as the edge degree.

4. The image providing device according to claim 3, wherein
   the second calculation unit calculates the second edge degree by weighting the first edge degrees so that a weight of the first edge degree of the certain region is greater than a weight of the first edge degree of the adjacent region.

5. The image providing device according to claim 1, wherein
   the assignment determination unit determines a region where the acquired edge degree is highest to be the assignment region to which the acquired image is assigned and the acquired image is preferentially placed at the assignment region.

6. The image providing device according to claim 1, further comprising:
   a color information acquisition unit that acquires color information indicating a representative color of the acquired image by a value and color information indicating a representative color of the region by a value,
   wherein the candidate determination unit determines the region where a difference between the value of the color information of the acquired image and the value of the color information of the region is smaller than or equal to a threshold value to be the candidate.

7. An image processing method in an image providing device for providing a mosaic image of an original image divided into a plurality of regions, the image processing method comprising:
   an image acquisition step of acquiring an image specified by a user;
   a candidate determination step of, on the basis of color information of the acquired image and color information of the plurality of regions of the original image, determining a set of regions among the plurality of regions to be candidates for an assignment region to which the acquired image is assigned;
   an edge degree acquisition step of acquiring edge degrees indicating degrees of edges in the set of candidate regions determined as the candidates;
   an assignment determination step of, on the basis of the acquired edge degrees, determining the assignment region, among the set of candidate regions, to which the acquired image is assigned and the acquired image is preferentially placed at the assignment region; and
   a presentation step of, outputting a mosaic image, in which, the acquired image is placed on the basis of the assignment region determined by the assignment determination step.

8. A non-transitory recording medium in which an image processing program is computer-readably recorded, the image processing program causing a computer, which is included in an image providing device for providing a mosaic image of an original image divided into a plurality of regions, to function as:
   an image acquisition unit that acquires an image specified by a user;
   a candidate determination unit that, on the basis of color information of the acquired image and color information of the plurality of regions of the original image, determines a set of candidate regions among the plurality of regions to be candidates for an assignment region to which the acquired image is assigned;
   an edge degree acquisition unit that acquires edge degrees indicating degrees of edges in the set of candidate regions determined as the candidates;
   an assignment determination unit that, on the basis of the acquired edge degrees, determines the assignment region, among the set of candidate regions, to which the acquired image is assigned and the acquired image is preferentially placed at the assignment region; and
   a presentation unit that, outputs a mosaic image, in which, the acquired image is placed on the basis of the assignment region determined by the assignment determination unit.

\* \* \* \* \*